United States Patent Office 2,812,328
Patented Nov. 5, 1957

2,812,328
NEW PYRIMIDINE DERIVATIVES

Walter Hepworth, Manchester, England, assignor to Imperial Chemical Industries Limited, London, England, a corporation of Great Britain No Drawing. Application June 21, 1955, Serial No. 517,055

Claims priority, application Great Britain July 9, 1954

2 Claims. (Cl. 260—251)

This invention relates to new pyrimidine derivatives.
The new pyrimidine derivatives of this invention are those of the formula:

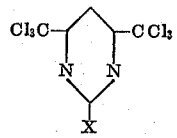

wherein X stands for a halogen atom, for example chlorine.

I have found that the said new pyrimidine derivatives are useful in the control of agricultural and horticultural pests, more particularly as fungicides. They are also useful as intermediates in the manufacture of chemotherapeutic agents, particularly of the anti-protozoal agents of co-pending United States application Serial No. 517,056, of even date herewith.

According to a further feature of the invention I provide a process for the manufacture of the new pyrimidine derivatives of our invention which comprises subjecting a pyrimidine derivative of the formula:

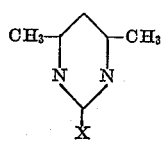

wherein X has the meaning stated above, to the action of chlorine.

The invention is illustrated but not limited by the following example in which the parts are by weight:

*Example*

2-chloro-4:6-dimethylpyrimidine is heated to 130–140° C. and so maintained while a stream of chlorine gas is passed through the molten substance until evolution of hydrogen chloride ceases. The product is then distilled under reduced pressure and a fraction B. P. 160–161° C./15 mm. is collected, separated and crystallised from ethanol. There is obtained 2-chloro-4:6-bistrichloromethylpyrimidine as a colourless crystalline substance, M. P. 100–101° C.

What I claim is:
1. A pyrimidine derivative of the formula:

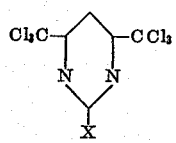

wherein X stands for a chlorine atom.

2. Process for the manufacture of 2-chloro-4:6-bis-trichloromethylpyrimidine which comprises subjecting a pyrimidine derivative of the formula:

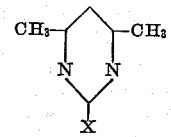

wherein X stands for a chlorine atom, to the action of chlorine.

No references cited.